Dec. 17, 1968   J. F. CULP   3,416,296
COTTON PICKUP UNIT
Filed July 7, 1966   2 Sheets-Sheet 1

← TRAVEL →

INVENTOR
JOHN F. CULP
BY
Cohn and Powell
ATTORNEYS

Dec. 17, 1968  J. F. CULP  3,416,296
COTTON PICKUP UNIT

Filed July 7, 1966  2 Sheets-Sheet 2

INVENTOR
JOHN F. CULP
BY
Cohn and Powell
ATTORNEYS

United States Patent Office 3,416,296
Patented Dec. 17, 1968

3,416,296
COTTON PICKUP UNIT
John F. Culp, Rte. 1, Box 163,
Bell City, Mo. 63735
Filed July 7, 1966, Ser. No. 563,603
12 Claims. (Cl. 56—28)

This invention relates generally to improvements in a cotton pickup unit, and more particularly to an attachment that can be advantageously utilized on or behind any cotton picker header or on a tractor to retrieve cotton that has fallen from the boll and is laying on the ground.

It is an important objective to provide a cotton pickup unit in which a plurality of endless flexible members are located and driven in side-by-side relation so that hook means, carried by the endless flexible members, pick up cotton from the ground as the lower spans drag the ground, and deliver the cotton to a transfer station.

An important objective is achieved by the provision of a plurality of sprockets mounted on and rotatable with a pair of spaced shafts extending transversely of and rotatively mounted to a frame, the sprockets being located in close adjacency and arranged in cooperating pairs between the shafts. The endless flexible members are provided by chains interconnecting cooperating pairs of sprockets, and the hook means are carried by each chain.

Another important objective is afforded by making some of the endless flexible members between the side arms of the attachment frame of greater length than others so that the lower spans will have different degrees of slack, whereby to follow an uneven ground contour.

Still another important objective is attained by making the endless flexible members between the side arms of the frame of greater length inwardly of the side arms so that the intermediate flexible members will hang lower than those members located at each side, whereby to accommodate and follow an uneven ground contour between adjacent rows of cotton plants.

An important object is realized by constructing a pair of pickup sections each of which includes a pair of laterally spaced side arms between which a set of endless flexible members are operatively driven in side-by-side relation. These pickup sections are arranged so that one of the side arms of one section is laterally adjacent to yet spaced from one of the side arms of the other section to accommodate a row of cotton plants in the space therebetween when the two pickup sections are disposed on opposite sides of a row of cotton plants, whereby the lower spans of both sections pick up cotton from the ground on opposite sides of the plant row.

Another important objective is provided by constructing the endless flexible members of the two pickup sections of progressively greater length in a direction away from the laterally adjacent yet spaced side arms of the sections, whereby the lower spans of the endless flexible members of the two sections have progressively increasing slack to follow the uneven ground contour on opposite sides of the plant row.

Yet another important object is achieved in that the transfer station includes a suction chute disposed adjacent the endless flexible members at one shaft of each pickup section, the suction chutes of adjacent pickup sections being laterally spaced to provide a space therebetween in alignment with the space between the laterally adjacent side arms of the pickup sections so that the row of cotton plants can move between the suction chutes and pickup sections.

An important object is provided by the provision of a third pair of laterally spaced side arms providing a third pickup section adjacent the other side of the first pickup section, one of the side arms of the third section being laterally adjacent to yet spaced from the other side arm of the first section so that another adjacent row of cotton plants can move in the space therebetween. The first pickup section extends between the adjacent rows of cotton plants, while the second and third pickup sections are disposed on opposite sides of the respective adjacent plant rows.

Another important object is attained by the structural arrangement in which the width of the second and third pickup sections is approximately one-half the width of the first or intermediate pickup section so as to clear the area between plant rows as the first pickup section is moved between every other adjacent pair of plant rows.

A further important objective is realized by the provision of endless flexible members in the intermediate pickup section which are of progressively greater length inwardly of the side frame arms so that the longer endless members are located in the middle and the shorter endless members are located at each side, and by the provision of endless flexible members in each of the outboard or second and third pickup sections of progressively greater length in a direction away from the respective side arms laterally adjacent to the laterally intermediate section, whereby the lower spans of the endless flexible members have sufficient slack to follow the uneven ground contour between and on opposite sides of a pair of laterally adjacent rows of cotton plants.

An important object is to provide a cotton pickup unit that is simple and durable in construction, economical to manufacture and assemble, highly efficient in operation, and which can be utilized by anyone with little or no instruction.

The foregoing and numerous other objects and advantages of the invention will more clearly appear from the following detailed description of a preferred embodiment, particularly when considered in connection with the accompanying drawings, in which.

Figure 1:
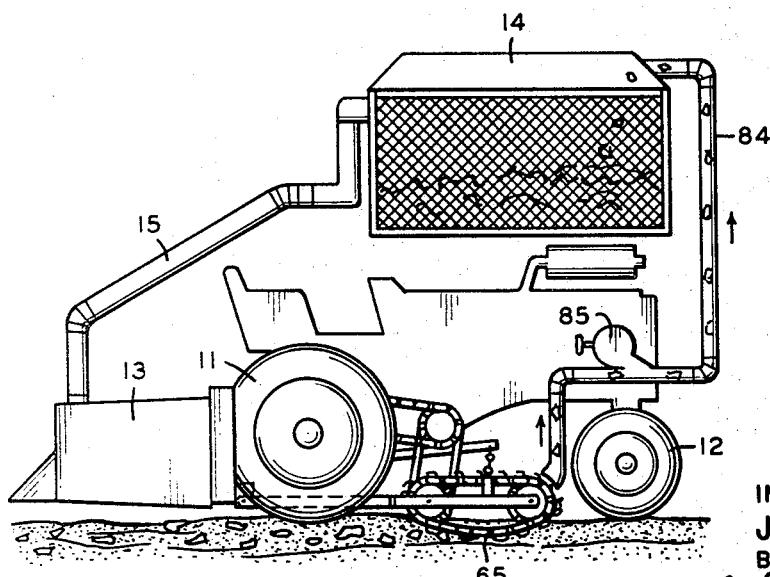
FIG. 1 is a side elevational view of the cotton pickup unit carried by a tractor and associated with a cotton picker header.

Referring now by characters of reference to the drawings, and first to FIG. 1, it will be understood that the cotton pickup unit can be used in association with the conventional type of tractor generally indicated by 10, this tractor having a pair of rear ground wheels 11, and having a single front wheel 12.

The conventional type of cotton picker header 13 is mounted on and carried by the tractor 10.

Figure 2:
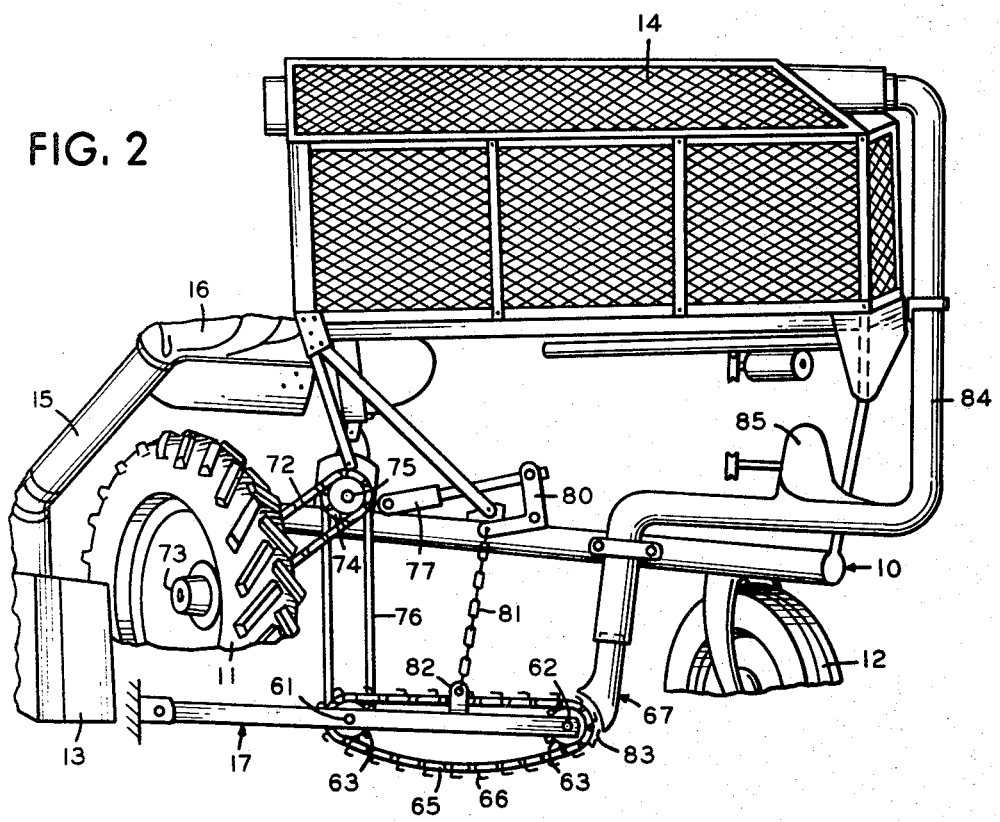
FIG. 2 is an enlarged side elevational view of the cotton pickup unit and its connection to a tractor, various parts of the tractor being omitted for the sake of clarity.

A relatively large receptacle 14, constituting a basket, is carried by and located above the tractor 10. A conveyor tube 15 operatively extends between and interconnects the cotton picker header 13 and the receptacle 14. A blower 16 (FIG. 2) is operatively connected in the conveyor tube 15 and provides a vacuum creating a suction that draws the cotton from the cotton picker header 13 as the cotton is picked from the cotton plants, and delivers the picked cotton through the conveyor tube 15 to the storage receptacle 14.

Figure 3:
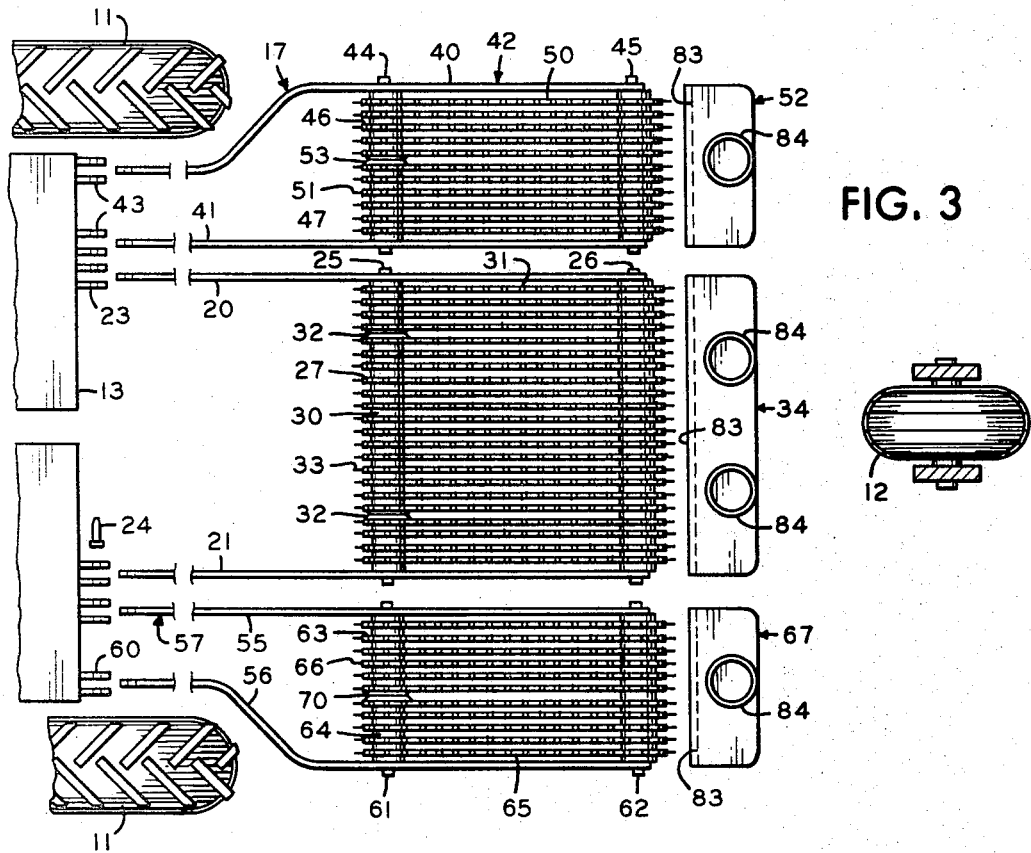
FIG. 3 is a top plan view of a cotton pickup unit.
Figure 4:
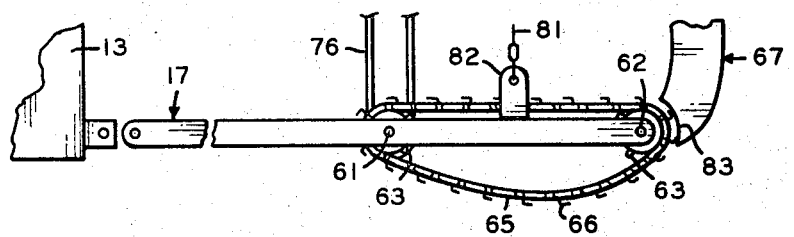
FIG. 4 is a side elevational view of the cotton pickup unit illustrated in FIG. 3.

As is best shown in FIG. 3, the cotton pickup unit is located below the tractor body and between the rear ground wheels 11 and the front wheel 12. This cotton pickup unit includes a frame generally indicated by 17 that is hingedly connected to and carried by the cotton picker header 13 or by some body portion of the tractor 10.

The frame 17 includes a pair of laterally spaced side arms 20 and 21 defining a first or intermediate pickup section referred to by 22. Each of the side arms 20 and 21 is held between and hingedly secured to a bracket 23, fixed to the header 13, by a pivot pin 24.

Extending between and rotatively mounted on the side arms 20 and 21 are a pair of spaced, transverse shafts 25 and 26. Drivingly mounted on each of the shafts 25 and 26 are a plurality of sprockets 27. Spacers 30, carried by each shaft 25 and 26, are located between adjacent sprockets 27. It will be understood that the sprockets 27 are arranged in cooperating pairs between the shafts 25 and 26. An endless flexible chain 31, constituting an endless flexible member, operatively interconnects each cooperating pair of sprockets 27. The chains 31 are driven by the shafts 25 and 26 and are disposed in close side-by-side relation, as is best seen in FIG. 3.

Instead of a spacer 30 at two points along the shaft 25, a pulley 32 is drivingly connected to the shaft 25. The pulleys 32 are utilized to drive the chains 31 and are operatively connected to a drive mechanism as will be apparent upon later description of parts.

Each of the chains 31 carries a plurality of hooks 33 adapted to spear cotton laying on the ground as the lower span of the chain 31 drags along the ground when driven by shafts 25 and 26. These hooks 33 pick up the cotton and deliver it to a transfer station generally indicated by 34 located immediately adjacent the shaft 26.

Figure 5:
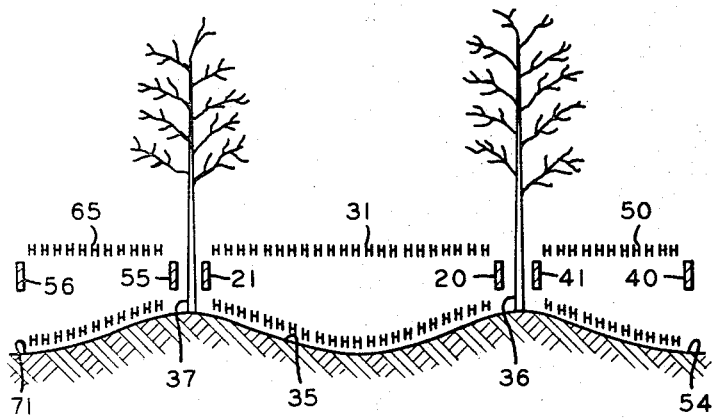
FIG. 5 is a diagrammatic illustration of the cotton pickup unit in operation with adjacent rows of cotton plants.

As will be understood best from FIG. 5, the chains 31 of the first section 22 are of progressively greater length inwardly of the side arms 20 and 21 so that the longer chains 31 are located in the middle and the shorter chains 31 are located at each side. The lower spans of the chains 31 have greater slack at the middle, whereby to follow an uneven ground contour 35 between adjacent rows 36 and 37 of cotton plants.

The frame 17 includes another pair of laterally spaced side arms 40 and 41 providing a second or outboard section generally indicated by 42. The side arms 40 and 41 are each hingedly connected to a bracket 43 by a pivot pin similar to pin 24 previously described, the brackets 43 being carried by the header 13.

The side arm 41 of the second section 42 is located adjacent to yet spaced from the side arm 20 of the first section 22 so as to provide a space therebetween adapted to receive a row 36 of cotton plants as indicated in FIG. 5 during cotton pickup operation.

Extending transversely between and rotatively mounted on the side arms 40 and 41 are a pair of spaced shafts 44 and 45. A plurality of sprockets 46 are drivingly attached to and carried by each of the shafts 44 and 45. These sprockets 46 are arranged in aligned cooperating pairs between the shafts 44 and 45. The sprockets 46 on each shaft 44 and 45 are separated by spacers 47 located therebetween. In the preferred embodiment, the shafts 44 and 45 are axially aligned transversely with the shafts 25 and 26 respectively of the first section 22.

Extending between and operatively interconnecting cooperating pairs of sprockets 46 are a plurality of chains 50, constituting endless flexible members. Each of the chains 50 is provided with a plurality of hooks 51 spaced regularly about its periphery. These hooks 51 are adapted to snag cotton laying on the ground as the lower spans of the chains 50 drag along the ground when driven by shafts 44 and 45, and deliver the cotton to a transfer station generally indicated by 52 located the length of the shaft 45.

A pulley 53 is drivingly attached to the shaft 44 and is substituted in lieu of one of the spacers 47. The pulley 53 is drivingly connected to a drive mechanism as will be apparent upon later description of parts.

The chains 50 of the second section 42 are of progressively greater length in a direction away from the side arm 41 that is laterally adjacent to the first pickup section, as is best seen in FIG. 5. The lower spans of the chains 50 will hang progressively lower so as to drag on and follow the ground contour 54 at the opposite side of the plant row 36.

The frame 17 includes another pair of laterally spaced side arms 55 and 56 providing a third pickup section generally indicated by 57. These side arms 55 and 56 are hingedly connected to brackets 60 carried by the header 13. The pickup section 57 is located on the opposite side of the first pickup section 22. The side arm 55 is laterally adjacent to yet spaced from the side arm 21 of the first pickup section 22 to provide a space therebetween adapted to receive the row 37 of cotton plants therebetween, as is best seen in FIG. 5, during cotton pickup operation.

Rotatively mounted on and extending transversely of the side arms 55 and 56 are a pair of shafts 61 and 62. In the preferred embodiment, the shafts 61 and 62 are axially aligned with the adjacent shafts 25 and 26 respectively of the first pickup section 22. A plurality of sprockets 63 are drivingly attached to and carried by each of the shafts 61 and 62. These sprockets 63 are arranged in aligned cooperating pairs between the shafts 61 and 62. A plurality of spacers 64 are carried by each of the shafts 61 and 62 and are located between adjacent sprockets 63.

Extending between and operatively connecting cooperating pairs of sprockets 63 are endless flexible chains 65, constituting endless flexible members. A plurality of hooks 66 are attached to and disposed in regularly spaced positions about the periphery of each chain 65. These hooks 66 are adapted to snag cotton laying on the ground as the lower spans of the chains 65 drag along the ground, the hooks delivering the cotton to a transfer station generally indicated by 67 located the length of the shaft 62.

A pulley 70 is operatively connected to the shaft 61 and is substituted in lieu of a spacer 64. The pulley 70 is operatively connected to a drive mechanism as will be apparent upon later description of parts.

The chains 65 of the third pickup section 57 are of progressively greater length in a direction away from the side arm 55 laterally adjacent to the first pickup section 22. The lower spans of the chains 65 hang progressively lower in order to conform to and follow the uneven ground contour 71 on the opposite side of the row 37 of cotton plants.

In the preferred construction of the cotton pickup unit, the width of the second and third pickup sections 42 and 57 is approximately one-half the width of the first pickup section 22 so as to clear the area between plant rows 36 and 37 as the first pickup section 22 is moved between every other adjacent pair of plant rows.

The drive mechanism for the cotton pickup unit includes a drive chain 72 (FIG. 2) operatively connected to the tractor axle 73 and operatively connected to a sprocket 74 that is attached to and carried by a transverse shaft 75. A plurality of pulleys (not shown) are connected to and rotatable with the shaft 75, such pulleys being operatively connected to aligned and cooperating pulleys 32, 53 and 70 of the cotton pickup sections 32, 42 and 57 respectively by belts 76.

The height-adjusting mechanism includes a hydraulic ram 77 operatively connected to a pivoted bell crank 80. A chain 81 operatively interconnects the bell crank 80 to a bracket 82 fixed to the unit frame 17. Upon actuation of the hydraulic ram 77, the bell crank 80 will pivot and will act through the chain 81 to raise or lower the cotton pickup unit by pivoting the unit frame 17 about its hinge connection.

Each of the transfer stations 34, 52 and 67 includes an open-mouth chute 83 located closely adjacent the hooks 33, 51 and 66 respectively of the associated pickup sections 22, 42 and 57 respectively, as the chains pass over and around the transverse shafts 26, 45 and 62 respectively. Each of these elongate transverse chutes 83 is operatively connected to the receptacle 14 by at least one conveyor tube 84. A blower 85 (FIG. 2) is attached to each of the tubes 84, creating a vacuum pressure in such tube 84 and creating a suction at the mouth of chute 83. As the hooks 33, 51 and 66 snag the cotton laying on the ground and bring it up to the chutes 83, the suction will remove the cotton from the hooks 33, 51 and 66, will convey the loose cotton through the tubes 84, and will deliver the cotton to receptacle 14 for storage.

The transfer station 34 is laterally spaced from the transfer station 52 to provide a space therebetween that is in alignment with the space between the first pickup section 22 and the second pickup section 42 so that the row 36 of cotton plants can move along and between the adjacent suction chutes 83 and the pickup sections 22 and 42. Similarly, the transfer station 34 is laterally spaced from the transfer station 67 to provide a space therebetween that is in alignment with the space provided between the first pickup section 22 and the third pickup section 57 so that the row 37 of cotton plants can move along and between the adjacent suction chutes 83 and the pickup sections 22 and 57.

It is thought that the functional advantages of the cotton pickup unit have become fully apparent from the foregoing detailed description of component parts, but for completeness of disclosure, the usage of the pickup unit will be briefly described.

This cotton pickup unit will work on or behind any cotton picker header. If the machine is a single row picker, the relatively narrow pickup sections 42 and 57 will be combined in a cotton pickup unit to work on opposite sides of a row of cotton plants. If the machine is a two row picker, the three section pickup unit disclosed in FIG. 3 is utilized to cover the area between adjacent rows of cotton plants and on opposite sides of such rows.

Of course, this cotton pickup unit can be used on different makes of cotton pickers or it can be made into an attachment for use without being attached onto a cotton picker.

When utilized in a double row cotton picker machine, the first pickup section 22 will move between adjacent plant rows 36 and 37, while the second and third pickup sections 42 and 57 will be located on opposite sides of such plant rows 36 and 37, as illustrated in FIG. 5. The plant rows 36 and 37 will move between the spaces provided between the transfer stations and the pickup sections. As the chains 31, 50 and 65 of the pickup sections are turned by the drive mechanism, the lower spans of such chains will drag along the ground. The height of the pickup unit is adjusted to enable this result. Because of the predetermined length of the chains 31, 50 and 65, the lower spans of such chains will follow and conform to the uneven ground contour 35, 54 and 71. The hooks 33, 51 and 66 will snag the loose cotton laying on the ground and will carry the cotton to the transfer stations 34, 52 and 67. The suction created at the chutes 83 will remove the cotton from the hooks 33, 51 and 66, will convey the cotton along tubes 84, and will discharge the cotton into the storage receptacle 14.

Although the invention has been described by making detailed reference to preferred embodiments, such detail is to be understood in an instructive, rather than in any restrictive sense, many variants being possible within the scope of the claims hereunto appended.

I claim as my invention:

1. In a cotton pickup unit:
   (a) a frame,
   (b) a pair of longitudinal spaced shafts extending transversely of and rotatively mounted on the frame,
   (c) a plurality of endless flexible members extending between and operatively driven by the shafts, the members being disposed in side-by-side relation and having lower spans which sag downwardly adjacent the surface of the ground,
   (d) hook means carried by the endless flexible members,
   (e) a transfer station adjacent the endless flexible members at one shaft for removing cotton from the hook means, and
   (f) means turning the shafts and driving the endless flexible members so that the lower spans drag the ground and the hook means on the lower spans pick up cotton from the ground and deliver the cotton to the transfer station.

2. A cotton pickup unit as defined in claim 1, in which:
   (g) a plurality of sprockets are mounted on and are rotatable with each shaft, the sprockets being located in close adjacency and arranged in cooperating pairs between the shafts,
   (h) the endless flexible members are chains interconnecting cooperating pairs of sprockets, and
   (i) the hook means are carried by each chain.

3. A cotton pickup unit as defined in claim 1, in which:
   (g) the frame includes a pair of laterally spaced side arms,
   (h) the shafts extend between the side arms, and
   (i) the endless flexible members are of lengths so that the lower spans loosely engage the ground.

4. A cotton pickup unit as defined in claim 3, in which:
   (j) some of the endless flexible members between the side arms are of greater length than others so that the lower spans will have different degrees of slack whereby to follow an uneven ground contour.

5. A cotton pickup unit as defined in claim 3, in which:
   (j) the endless flexible members between the side arms are of greater length inwardly of the side arms so that the lower spans of the intermediate endless flexible members hang lower than the side members whereby to follow an uneven ground contour between adjacent rows of cotton plants.

6. A cotton pickup unit as defined in claim 1, in which:
   (g) the frame includes a first pair of laterally spaced side arms providing a first pickup section,
   (h) a pair of said spaced shafts extend between the first pair of side arms,
   (i) a first set of said endless flexible members extend between the shafts of the first pickup section,
   (j) the frame includes a second pair of laterally spaced side arms providing a second pickup section,
   (k) one of the side arms of the second section is laterally adjacent yet spaced from one of the side arms of the first section so that a row of cotton plants can move in the space therebetween,
   (l) a pair of said spaced shafts extend between the second pair of side arms,
   (m) a second set of said endless flexible members extend between the shafts of the second pickup section, and
   (n) the two pickup sections are disposed on opposite sides of a row of cotton plants, whereby the lower spans of both sections pick up cotton from the ground on opposite sides of the plant row.

7. A cotton pickup unit as defined in claim 6, in which:
   (o) the endless flexible members of the two pickup sections are of progressively greater length in a direction away from the laterally adjacent yet spaced side arms of the sections, whereby the lower spans of said members of the two sections have progressively increasing slack to follow the uneven ground contour on opposite sides of the plant rows.

8. A cotton pickup unit as defined in claim 6, in which:
   (o) the transfer station includes a suction chute disposed adjacent the endless flexible members at one shaft of each pickup section, and
   (p) the suction chutes of adjacent pickup sections are laterally spaced to provide a space therebetween in alignment with the space between the laterally adjacent side arms of the pickup sections so that the row of cotton plants can move along and between the suction chutes and pickup sections.

9. A cotton pickup unit as defined in claim 1, in which:
(g) the frame includes a first pair of laterally spaced side arms providing a first pickup section,
(h) a pair of spaced shafts extending between the first pair of side arms,
(i) a first set of endless flexible members extending between the shafts of the first pickup section,
(j) the frame includes a second pair of laterally spaced side arms providing a second pickup section adjacent one side of the first pickup section,
(k) one of the side arms of the second section is laterally adjacent yet spaced from one of the side arms of the first section so that a row of cotton plants can move in the space therebetween,
(l) a pair of said spaced shafts extend between the second pair of side arms,
(m) a second set of said endless flexible members extend between the shafts of the second pickup section,
(n) the frame includes a third pair of laterally spaced side arms providing a third pickup section adjacent the other side of the first pickup section,
(o) one of the side arms of the third section is laterally adjacent yet spaced from the other side arm of the first section so that another adjacent row of cotton plants can move in the space therebetween,
(p) a pair of said spaced shafts extend between the third pair of side arms,
(q) a third set of said endless flexible members extend between the shafts of the third pickup section, and
(r) the first pickup section extends between the adjacent rows of cotton plants, while the second and third pickup sections are disposed on opposite sides of the respective adjacent plant rows.

10. A cotton pickup unit as defined in claim 9, in which:
(s) the width of the second and third pickup sections is approximately one-half of the first pickup section so as to clear the area between plant rows as the first pickup section is moved between every other adjacent pair of plant rows.

11. A cotton pickup unit as defined in claim 10, in which:

(t) the endless flexible members of the first pickup section are of progressively greater length inwardly of the side arms so that the longer endless members are located in the middle and the shorter endless members are located at each side,
(u) the endless flexible members of each of the second and third pickup sections are of progressively greater length in a direction away from the respective side arms laterally adjacent to the first pickup section, and
(v) the lower spans of the endless flexible members have sufficient slack to follow the uneven ground contour between and on opposite sides of a pair of laterally adjacent rows of cotton plants.

12. A cotton pickup unit as defined in claim 11, in which:
(w) a plurality of sprockets are mounted on and are rotatable with each shaft, the sprockets being located in close adjacency and arranged in cooperating pairs between coacting shafts of each pickup section,
(x) the endless flexible members are chains interconnecting operating pairs of sprockets,
(y) the hook means are carried by each chain,
(z) the transfer station includes a suction chute disposed adjacent the endless flexible members at one shaft of each pickup section, and
(aa) the suction chutes of adjacent pickup sections are laterally spaced to provide a space therebetween in alignment with the space between the laterally adjacent side arms of the pickup sections so that the laterally adjacent rows of cotton plants can move along and between the suction chutes and pickup sections.

References Cited
UNITED STATES PATENTS

| | | | |
|---|---|---|---|
| 24,609 | 6/1859 | Bishop | 56—49 |
| 1,300,276 | 4/1919 | Johnson | 56—49 |
| 2,136,126 | 11/1938 | Dove | 56—49 |
| 2,928,224 | 3/1960 | Powell | 56—28 |
| 3,039,257 | 6/1962 | Brewster | 56—28 |
| 3,101,581 | 8/1963 | Kelso | 56—28 |
| 3,358,430 | 12/1967 | Attebery | 56—28 |

RUSSELL R. KINSEY, *Primary Examiner.*